G. BEYER.
PORTABLE STOVE.
APPLICATION FILED AUG. 24, 1909.
981,608.
Patented Jan. 17, 1911.
4 SHEETS—SHEET 4.
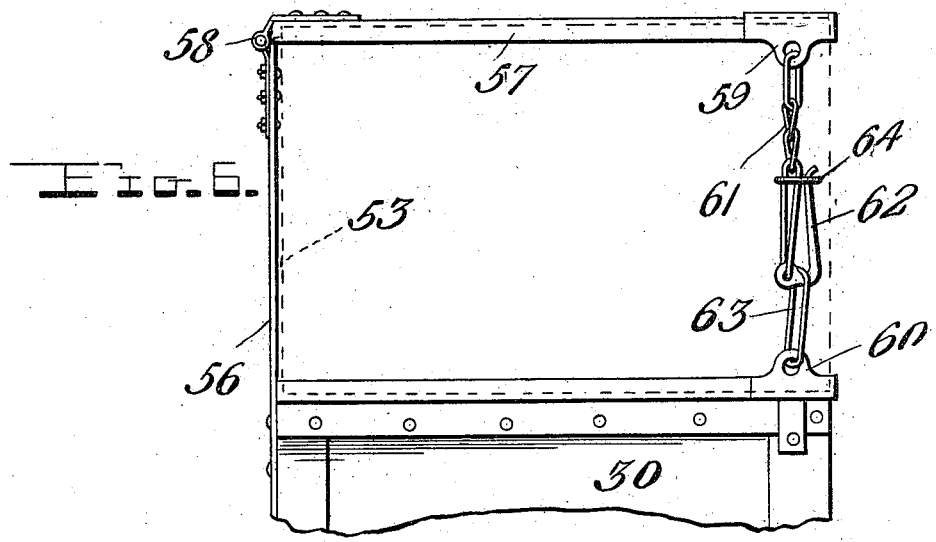
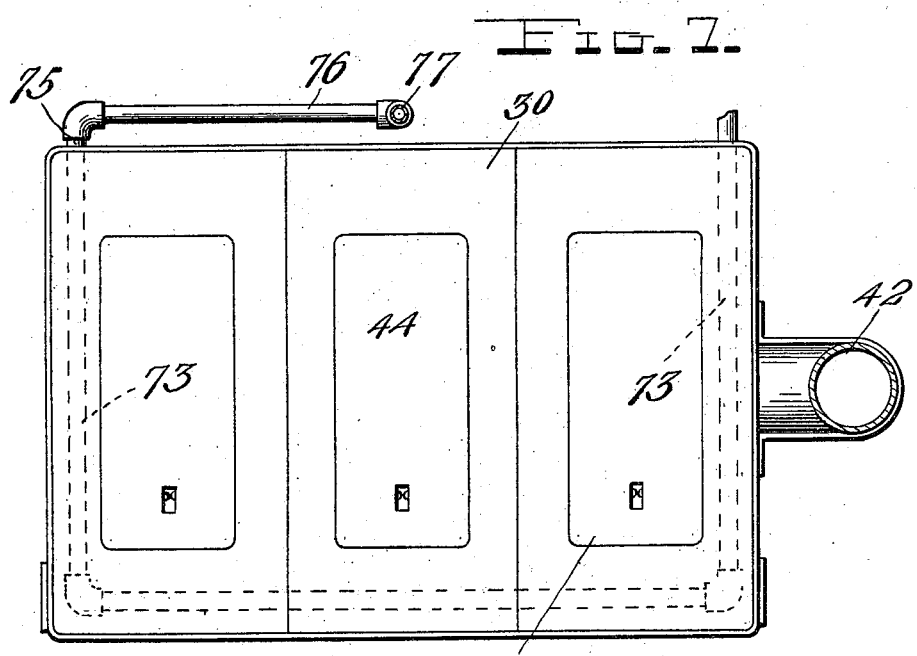
Witnesses
Chas. L. Griesbauer.
E. M. Ricketts
Inventor
Gustav Beyer
By Watson E. Coleman
Attorney

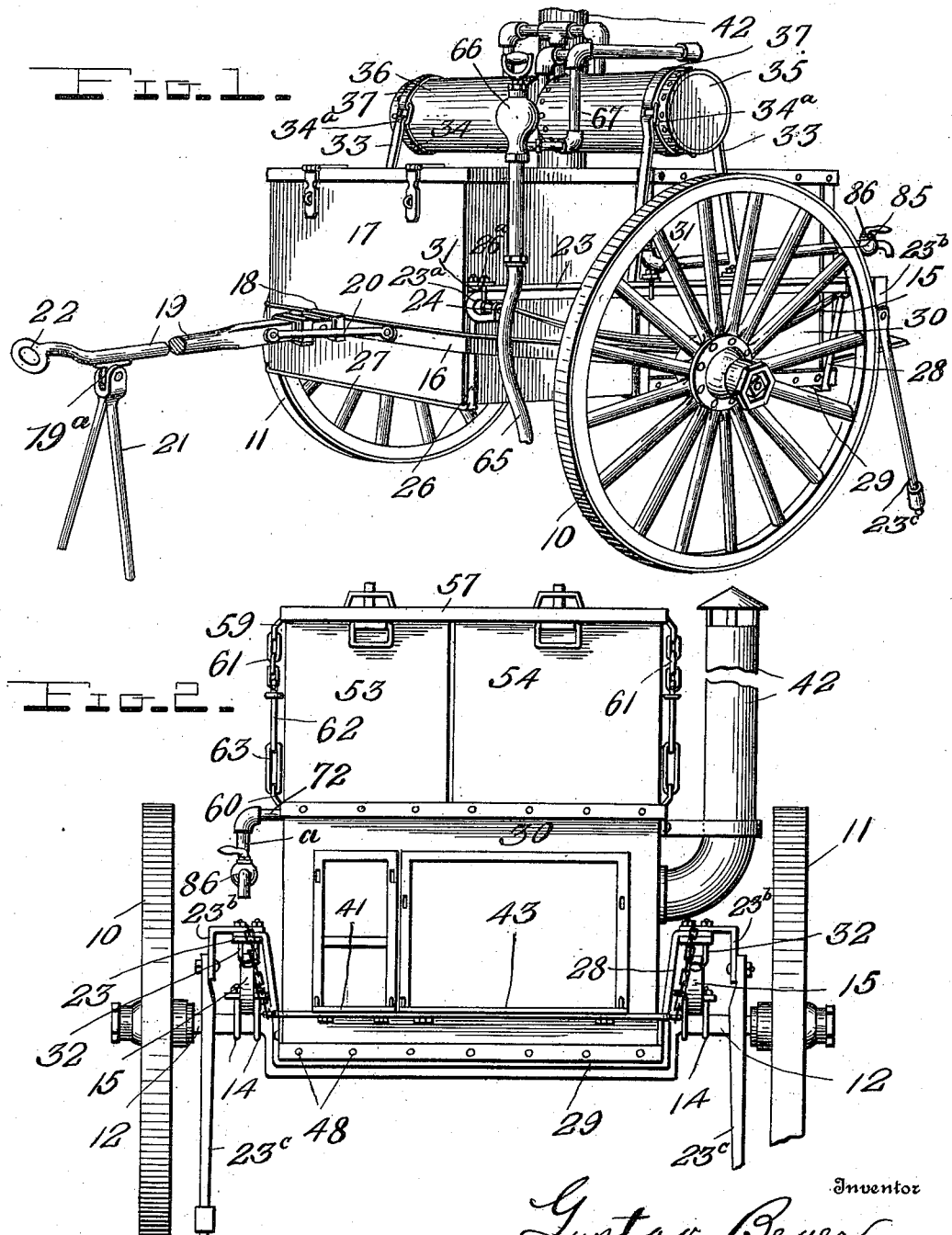

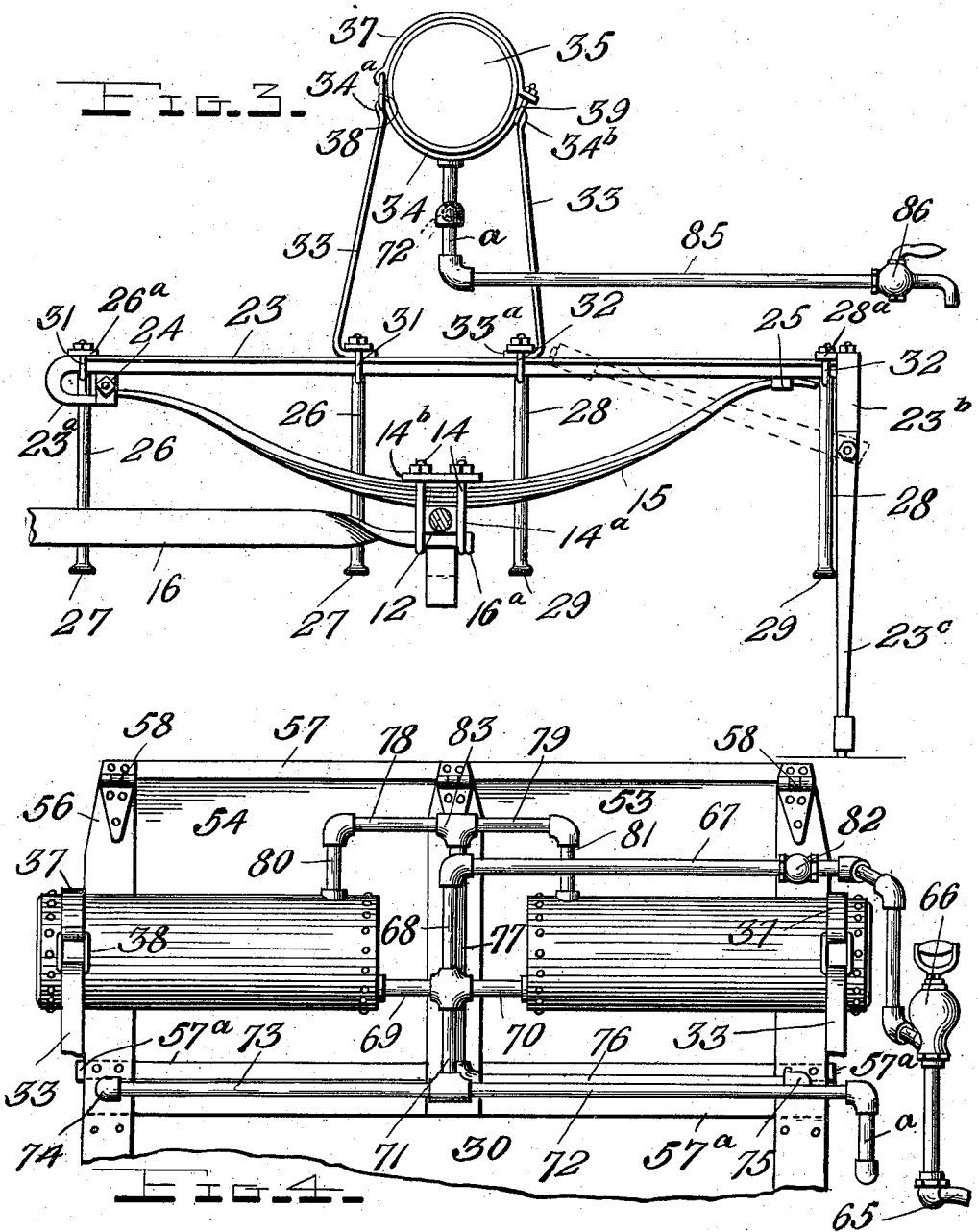

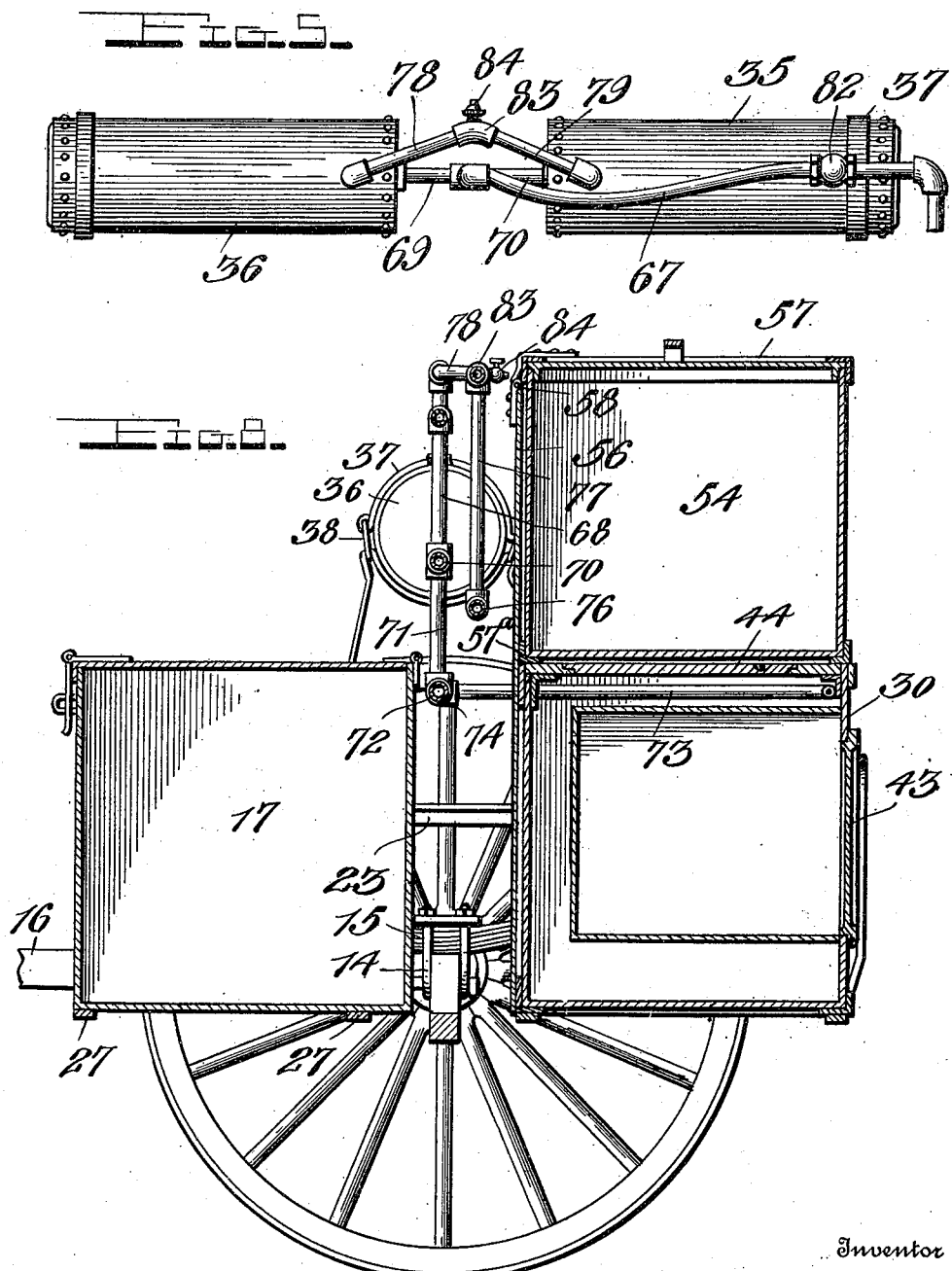

UNITED STATES PATENT OFFICE.

GUSTAV BEYER, OF SAN FRANCISCO, CALIFORNIA.

PORTABLE STOVE.

981,608.  Specification of Letters Patent.  Patented Jan. 17, 1911.

Application filed August 24, 1909.  Serial No. 514,428.

*To all whom it may concern:*

Be it known that I, GUSTAV BEYER, a subject of the Emperor of Germany, and a prospective citizen of the United States, residing at San Francisco, in the county of San Francisco and State of California, have invented certain new and useful Improvements in Portable Stoves, of which the following is a specification, reference being had to the accompanying drawings.

This invention is in the nature of a portable or traveling kitchen or cooking apparatus designed especially for the use of troops on the march but obviously equally well adapted for the use of any body of people on the move, or out of reach of fixed cooking apparatus.

The objects of the invention are to increase the capacity of such devices, strengthen their construction, simplify and improve their operation, and render them less liable to injury or breakage while subjected to the unavoidable jars and strains to which they are subjected in rapidly moving from place to place.

With these objects in view the invention consists in the improved construction, arrangement and combination of the parts of an apparatus of this character, all as fully described hereinafter and afterward specifically pointed out in the appended claims.

In order that my invention may be readily comprehended, I will now proceed to describe its construction and operation, having reference to the accompanying drawings in which—

Figure 1 is a perspective view of a complete apparatus embodying my invention and showing it ready for use for cooking purposes; Fig. 2 is a rear end elevation of the same. Fig. 3 is a view, in side elevation, of the frame on which the cooking apparatus is supported, the axle being shown in transverse section and the rear prop being shown down, in full lines, in position for supporting the apparatus, and up, in dotted lines, in the position in which it is placed while the apparatus is being moved from place to place, the tank being shown in end elevation and the pipe and faucet for drawing hot water being also illustrated; Fig. 4 is a view in side elevation of the tanks, pipe connections and stove; Fig. 5 is a view, in top plan, of the tanks and part of the pipe connections; Fig. 6 is a view, in side elevation, of the frame for holding the boilers in position on top of the stove, part of the stove being also shown, and the outline of a boiler being shown in dotted lines; Fig. 7 is a view, in top plan, of the stove and chimney, a water pipe in the stove being shown in dotted lines; and Fig. 8 is a vertical longitudinal sectional view.

Like reference characters mark the same parts in all of the figures.

Referring specifically to the drawings 10 and 11 indicate a pair of ordinary wheels which support the apparatus, and which are journaled on the ends of an axle 12 which has a downwardly offset intermediate portion as shown in Fig. 2.

15 denote two longitudinal curved springs which have their central portions resting on the ends of the axle and secured thereto by clips 14 each consisting of a pair of U-shaped bolts $14^a$ disposed on opposite sides of the axle and straddling one of the springs 15, their threaded upper ends projecting through a plate $14^b$ resting on the top of such spring and carrying nuts, as clearly shown in Fig. 3. The closed lower ends of the bolts $14^a$ extend around the twisted rear ends of two side bars 16, the rear extremities of the latter being formed with downturned stop lugs $16^a$ which prevent them from being pulled out of the clips.

The side bars 16 project forwardly from the axle and bend inwardly at right angles to extend across the front of one or more suitable provision boxes 17, the forward extremities of the bars 16 being again bent at right angles in a forward direction to receive between them a tongue 19. Said tongue is retained between the extremities of the bars 16 by surrounding loops or clips 18 and also by diagonal braces 20, as clearly shown in Fig. 1. At the front extremity of the tongue is formed a hand loop or ring 22, by means of which the apparatus may be conveniently handled, and on the bottom of the forward portion of said tongue is a depending hinge lug $19^a$ to which is pivoted the upper end of a prop 21, the latter being V-shaped and having diverging arms to engage the ground when the prop is swung downwardly and thereby effectively support the forward portion of the device.

Supported by and arranged longitudinally above the springs 15 are side beams 23 constructed of angle metal and having the forward extremities of their vertical flanges bent downwardly and rearwardly to provide hooks 23ª, to the ends of which are hinged as at 24 the forward end of the springs 15. The rear extremities of said springs are slidably arranged in loops 25, as shown in Fig. 3.

Bolted to the rear extremities of the side beams 23 are right angular brackets 23ᵇ, to which latter are pivoted vertically swinging props 23ᶜ which when lowered are adapted to support the rear portion of the device or apparatus, as will be seen on reference to Figs. 1 and 2.

26—26 and 28—28 denote four transversely extending U-shaped hangers depending from and connecting the angle metal side beams 23. The hangers 26 have horizontal connecting portions 27 which support the provision box 17 and the upper extremities of the side portions or arms of said hangers are outwardly bent as at 26ª to rest upon the side beams 23, said ends 26ª being united to said beams by U-shaped bolts or clips 31. The hangers 28 have similar connecting bars 29 which support the stove 30 and the upper extremities of the vertical arms of these hangers have outturned portions 28ª which are united to the beams 23 by U-bolts or clips 32.

35, 36 denote transversely and horizontally disposed tanks of cylindrical shape supported above the box and stove by means of supporting brackets or hangers, each of which is formed from a metal strap having its central portion bent into semicircular shape to provide a seat 34 to receive one of said tanks, and its remaining portion bent to provide uprights 33. The lower extremities of the latter have inturned ends 33ª secured beneath the outturned ends of one of the two inner hangers 26, 28, see Fig. 3. The portions of the metal strap at the junction of the uprights 33 and the curved seat 34 have eyes 34ª—34ᵇ, the former of which receives a rectangular link 38, and the latter an eye bolt 39. A longitudinally curved stirrup strap 37 has one of its ends pivotally mounted by the link 38, and its other end is apertured to receive the bolt 39 whereby the tank will be securely but removably supported on the bracket, as will be readily understood on reference to Fig. 3.

The stove 30 may be of any suitable form and construction, but as illustrated, it is of rectangular shape and has a fire box closed by a door 41, an oven closed by a door 43, a chimney or smoke pipe 42, and suitable openings in its top closed by removable lids 44, see Fig. 7. The doors 41 and 43 are shown in their lowered or open position in Fig. 2.

Boilers 53 and 54 for coffee, soup, etc., are removably mounted on top of the stove. These boilers have their bottoms arranged in a rectangular angle metal frame 57ª secured to the top of the stove, and they are retained in position by a rectangular angle metal frame 57 arranged to fit on the tops of said boilers. This upper frame 57 has its front edge connected by hinges 58 to the upper extremities of upright bars 56, which latter are secured to and rise from the stove 30, see Fig. 6. The corners of the free portion of the retaining frame 57 are provided with apertured bracket lugs 59, and similar bracket lugs 60 are secured to the corresponding corners of the top of the stove. Detachable connections unite the opposing or superposed lugs 59, 60, each of such connections consisting of a chain 61 depending from the lug 59 and carrying a dog hook 62 which engages a link 63 in the lug 60 and which is retained in locked position by a sliding loop or link 64, as clearly shown in Fig. 6.

In Figs. 4 and 5 the arrangement of the piping for conducting water to and from the tanks is shown in detail. A suitable hose 65 from any suitable supply of water, is secured to the lower end of a pump 66 of any suitable construction, preferably of a powerful class so that it may be used for other purposes, especially, for instance, as a fire extinguisher. From the pump, a pipe 67 leads up, over one of the tanks and thence horizontally to a vertical pipe 68 from which lead branches 69, 70 to the respective tanks. The coupling at the junction of pipe 68 and branches 69 and 70 is a four way coupling from which the vertical pipe continues downward as at 71 and from which a pipe 72 leads horizontally to one side of the device where it turns downwardly and then turns rearwardly as at 85, a faucet 86 being arranged on the extremity of said pipe at the rear of the device for the purpose of drawing off water from the tanks. In the opposite direction a pipe 73 leads off from the pipe 71 to an elbow 74 whence it turns into the stove (see Fig. 7) running around the top of the inside of the stove, as shown in dotted lines, leaving the stove at 75 and passing along horizontally at 76, vertically upward at 77, again horizontally at 78, 79, and again vertically, but downward, at 80, 81, into the top of the tanks. The pipe leading from the pump is supplied with a suitable horizontal check valve 82 to prevent back action in the usual manner. At the joint 83, between branches 78 and 79, an air valve 84 is provided.

A water heating system and storage plant is thus provided which will work perfectly whether the apparatus is stationary or traveling and a complete plant for baking and for boiling or stewing two or more articles which will also be uninterrupted in its operation while on the road so that a complete cooked meal may be served to a large number of persons as soon as a halt is made.

Having thus fully described my invention, what I claim as new and desire to secure by Letters Patent of the United States is,

1. A portable stove comprising a supporting frame, a stove body arranged therein and containing a water-back, a pair of longitudinally alined cylindrical water tanks arranged adjacent the stove and supported at their outer ends, a cross pipe connecting the inner ends of the tanks and having upper and lower branches, the lower branch being connected to said water-back, a hand pump connected to the upper branch, a hose connected to the intake of the pump, a discharge pipe connected to said lower branch and provided with a faucet, a hot water pipe leading from the water-back and having branches communicating with the upper portions of the two tanks, and a wheeled truck for supporting the said parts, substantially as and for the purpose set forth.

2. In a portable stove, the combination of a supporting frame forming part of a wheeled truck and including spring-supported side beams, a pair of longitudinally alined, cylindrical tanks having their inner ends connected, brackets for supporting the outer ends of the tanks and each formed from a metal strap having its central portion bent to provide a concaved tank seat with eyes at the ends of the latter, the end portions of the strap forming spaced uprights having angular lower ends, clips fastening said angular lower ends to the side beams of the frame, links and eye bolts engaged with the eyes at the ends of said tank seats, and curved stirrup straps to extend over the tanks, one end of each stirrup strap being engaged with one of the links and its other end with a corresponding eye bolt.

3. In a portable stove, the combination of a stove body mounted on a wheeled truck, uprights rising from the rear side of the stove, apertured plates adjacent the front corners of the stove, boilers arranged on top of the stove, an angle metal retaining frame to fit over the tops of the boilers, hinges uniting the rear side of the frame to the upper ends of the uprights, apertured plates on the front corners of the retaining frame, and flexible, detachable connections between the apertured plates on the frame and stove.

In testimony whereof I hereunto affix my signature in the presence of two witnesses.

GUSTAV BEYER.

Witnesses:
 WILLIAM THOMPSON,
 JOSEPH G. BYE.